United States Patent
Crapo et al.

(10) Patent No.: US 11,675,825 B2
(45) Date of Patent: Jun. 13, 2023

(54) METHOD AND SYSTEM FOR PRINCIPLED APPROACH TO SCIENTIFIC KNOWLEDGE REPRESENTATION, EXTRACTION, CURATION, AND UTILIZATION

(71) Applicant: GENERAL ELECTRIC COMPANY, Schenectady, NY (US)

(72) Inventors: Andrew Walter Crapo, Niskayuna, NY (US); Nurali Virani, Niskayuna, NY (US); Varish Mulwad, Niskayuna, NY (US)

(73) Assignee: GENERAL ELECTRIC COMPANY, Schnectady, NY (US)

(*) Notice: Subject to any disclaimer, the term of this patent is extended or adjusted under 35 U.S.C. 154(b) by 450 days.

(21) Appl. No.: 16/791,617

(22) Filed: Feb. 14, 2020

(65) Prior Publication Data

US 2020/0265060 A1    Aug. 20, 2020

Related U.S. Application Data

(60) Provisional application No. 62/805,772, filed on Feb. 14, 2019.

(51) Int. Cl.
*G06F 16/36* (2019.01)
*G06F 16/25* (2019.01)
*G06F 16/245* (2019.01)
*G06N 5/02* (2023.01)

(52) U.S. Cl.
CPC ........ *G06F 16/367* (2019.01); *G06F 16/245* (2019.01); *G06F 16/254* (2019.01); *G06N 5/02* (2013.01)

(58) Field of Classification Search
CPC ...... G06F 16/254; G06F 16/245; G06F 40/20; G06N 5/02
See application file for complete search history.

(56) References Cited

U.S. PATENT DOCUMENTS

| | | | |
|---|---|---|---|
| 7,051,293 | B1 | 5/2006 | Teig et al. |
| 8,195,598 | B2 | 6/2012 | Hua et al. |
| 8,521,669 | B2 | 8/2013 | Knoblauch |

(Continued)

FOREIGN PATENT DOCUMENTS

CN    106682738 A    5/2017

OTHER PUBLICATIONS

McGarry, Ken, et al., "Auto-Extraction Representation and Integration of a Diabetes Ontology using Bayesian Networks", School of Computing and Technology, University of Sunderland, UK Schookl of Pharmacy, 2007, IEEE, 6 pp.

(Continued)

*Primary Examiner* — Yuk Ting Choi
(74) *Attorney, Agent, or Firm* — Buckley, Maschoff & Talwalkar LLC

(57) ABSTRACT

A system, method, and computer-readable medium to extract information from at least one of code and text documentation, the extracted information conforming to a base ontology and being extracted in the context of a knowledge graph; add the extracted information to the knowledge graph; generate, in a mixed interaction with a user selectively in communication with the system, computational models including scientific knowledge; and persist, in a memory, a record of the generated computational models.

17 Claims, 13 Drawing Sheets

(56) References Cited

U.S. PATENT DOCUMENTS

| | | | |
|---|---|---|---|
| 9,652,719 B2 | 5/2017 | Bounouane et al. | |
| 9,727,560 B2* | 8/2017 | Chakerian | G06F 16/81 705/7.29 |
| 10,698,938 B2* | 6/2020 | Miracolo | G06F 16/93 705/319 |
| 11,106,736 B1* | 8/2021 | Newman | G06N 3/08 705/319 |
| 2007/0005257 A1 | 1/2007 | Cheng et al. | |
| 2009/0012842 A1 | 1/2009 | Srinivasan et al. | |
| 2010/0100546 A1 | 4/2010 | Kohler | |
| 2014/0279622 A1* | 9/2014 | Lamoureux | G06Q 50/01 705/319 |
| 2015/0106157 A1* | 4/2015 | Chang | G06F 40/237 705/7.29 |
| 2016/0335544 A1* | 11/2016 | Bretschneider | G06F 16/367 705/7.29 |
| 2017/0212748 A1* | 7/2017 | Agnew | G06F 8/20 705/7.29 |
| 2017/0228372 A1* | 8/2017 | Moreno | G06F 16/24522 705/7.29 |
| 2018/0060301 A1* | 3/2018 | Li | G06F 40/289 705/7.29 |
| 2018/0129941 A1* | 5/2018 | Gustafson | G06N 20/00 705/7.29 |
| 2018/0137424 A1* | 5/2018 | Gabaldon Royval | G06N 5/022 705/7.29 |

OTHER PUBLICATIONS

Rajput, Quratulain et al., "Use of Bayesian Network in Information Extraction from Unstructured Data Sources", World Academy of Science, Engineering and Technology, International Journal of Computer, Electrical, Automation, Control and Information Engineering, Vol. 3, No. 4, 2009, 7 pp.

\* cited by examiner

|  | Precision | Recall | F-measure | Accuracy |
|---|---|---|---|---|
| Scientific Concepts | 0.9761 | 0.9109 | 0.9424 | 0.9424 |
| Equations | 0.9322 | 0.8871 | 0.9091 | 0.9091 |

*FIG. 6*

Equation Text: a^2 = R * T * gamma

Tagged Equation:
a^2 <B-EQUATION> = <I-EQUATION> R <I-EQUATION> * <I-EQUATION> T <I-EQUATION> * <I-EQUATION> gamma <I-EQUATION>

Equation Text: a^2 = R * T * (1 + (gamma - 1) / ( 1 + (gamma-1) * [(theta/T)^2 * e^(theta/T) /(e^(theta/T) -1)^2)] }

Tagged Equation:
a^2 <B-EQUATION> = <I-EQUATION> R <I-EQUATION> * <I-EQUATION> T <I-EQUATION> * <I-EQUATION> (1 <I-EQUATION> + <I-EQUATION> (gamma <I-EQUATION> - <I-EQUATION> 1) <I-EQUATION> / <I-EQUATION> ( <I-EQUATION> 1 <I-EQUATION> + <I-EQUATION> (gamma-1) <I-EQUATION> * <I-EQUATION> [(theta/T)^2 <I-EQUATION> * <I-EQUATION> e^(theta/T) <I-EQUATION> /(e^(theta/T) -1)^2)] <I-EQUATION> ) <I-EQUATION> <I-EQUATION>

*FIG. 7*

Because the speed <B-CONCEPT> of <I-CONCEPT> transmission depends on molecular collisions, the speed <B-CONCEPT> of <I-CONCEPT> sound <I-CONCEPT> depends on the state of the gas. The speed <B-CONCEPT> of <I-CONCEPT> sound <I-CONCEPT> is a constant within a given gas and the value of the constant depends on the type of gas (air, pure oxygen, carbon dioxide, etc.) and the temperature <B-CONCEPT> of the gas.

*FIG. 8*

```
mdl = tf.Graph()
with mdl.as_default():
    str1 = "def speedOfSound_1(T, R, gam): \n \t return math.sqrt(R*gam*T) "
    exec(str1)

str2 = "def speedOfSound_2(T, R, gam): \n \t theta = 3056.0 #in Kelvin \
    \n \t x1 = math.sqrt(R * T * (1 + (gam - 1) / ( 1 + (gam-1) * ((theta/T)**2 \
    * np.exp(theta/T)/(np.exp(theta/T) -1)**2)))) \
    \n \t return x1"
    exec(str2)

def my_func(T, R, gam, cp_flag):
        if cp_flag:
            y = tf.py_func(speedOfSound_1, [T, R, gam], tf.double, name="speedOfSound")
        else:
            y = tf.py_func(speedOfSound_2, [T, R, gam], tf.double, name="speedOfSound")
        return y cp_flag = tf.placeholder(tf.bool, name="caloricallyPerfectGasFlag")
    T = tf.placeholder(tf.double, name="temperature")
    R = tf.placeholder(tf.double, name="gasConstant")
    gam = tf.placeholder(tf.double, name="specificHeatRatio")
    tf_my_func = autograph.to_graph(my_func)
    z = tf_my_func(T, R, gam, cp_flag)

sess = tf.Session(graph=mdl)
yval = sess.run(z, {T:[300.0], R: 286.0, gam: 1.4, cp_flag:True})
```

*FIG. 13*

METHOD AND SYSTEM FOR PRINCIPLED APPROACH TO SCIENTIFIC KNOWLEDGE REPRESENTATION, EXTRACTION, CURATION, AND UTILIZATION

BACKGROUND

The field of the present disclosure generally relates to knowledge graphs, and more particularly, to aspects of representing, extracting, curating, and using scientific knowledge in a knowledge graph.

Data regarding an area of interest or a domain may reside in a number of data sources. In some instances, the data sources might include academic and scientific papers, software documentations, news articles, social media, data stores of these and/or other types of data structures and representations. In some instances, some data, even when collected or otherwise obtained or identified as being at least somewhat related or of interest, might not be easily navigated, queried, represented, and/or explained.

Accordingly, in some respects, a need exists for methods and systems that provide an efficient and accurate mechanism for efficiently representing, extracting, curating, and using collections of data in a knowledge graph.

BRIEF DESCRIPTION OF THE DRAWING

FIG. 6 is an illustrative depiction of data related to the training of a model, in accordance with some embodiments herein;

FIG. 7 is an illustrative depiction of accurately tagged equations extracted from a data source, in accordance with some embodiments herein;

FIG. 8 is an illustrative depiction of partially extracted concepts, in accordance with some embodiments herein;

FIG. 9 includes an illustrative example of model code, in accordance with some embodiments herein;

FIG. 10 includes an illustrative example of model code, in accordance with some embodiments herein;

FIG. 13 is an illustrative depiction of an example of code to execute a computational graph model, in accordance with some embodiments herein.

DETAILED DESCRIPTION

The following description is provided to enable any person in the art to make and use the described embodiments. Various modifications, however, will remain readily apparent to those in the art.

In some aspects, the disclosed system design, architecture, and methodology herein may enable numerous functional capabilities. These capabilities include, but are not limited to, the following.

The extraction of RDF triples conforming to a base OWL ontology from code, add curated content to the knowledge graph; the extraction of RDF triples conforming to a base OWL ontology from text, including code comments, code documentation, and publications, and add curated content to the knowledge graph; the generation of computable models capturing scientific knowledge in a K-CHAIN computational graph with rich semantics of each model captured in the knowledge graph. Models can be physics-based or data-based and can be aggregated into composite models; the execution of knowledge curation guided by (1) the system's awareness of gaps and weaknesses in the knowledge, including an inability to answer questions and (2) a human user's directions to the system and answers to questions from the system (human in-the-loop).

Figure 1:
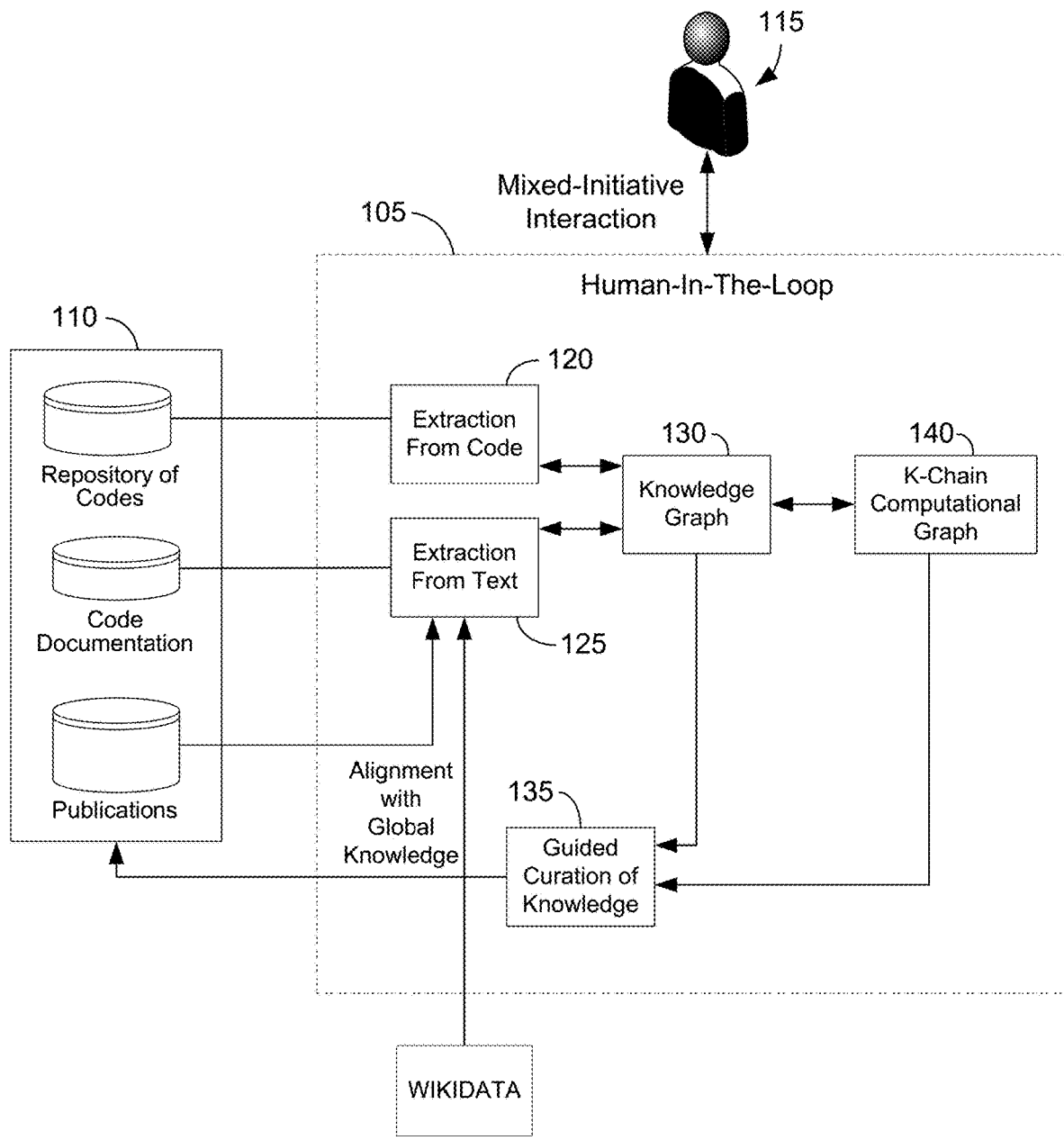
FIG. 1 is an illustrative depiction of an overall functional architecture, in accordance with some embodiments herein.

An overall functional architecture for a system herein is illustrated in FIG. 1. In some embodiments, knowledge curation uses a variety of sources 110, such as code, documentation, and relevant publications. The extraction 120, 125 might be carried out in the context of a knowledge graph 130 for code or text independently or in a coordinated effort with a human-in-the-loop 115. System 100 allows for mixed initiative interaction with users and creates computational instantiations of quantitative aspects of knowledge using computational graphs in K-CHAIN framework 140.

In some aspects, several principles have guided the system design herein. First, the system may be designed so that a human user is a participant in knowledge extraction and curation and is not limited to the role of querying the knowledge base for answers. The system may thus be designed for and have a mixed initiative capability that allows the user to both ask questions and provide unsolicited information, while also allowing the system to ask the user questions and ingest responses. Designing to this principle has far-reaching effects on the system architecture, as will be disclosed below.

Another guiding principle of a system architecture may be locality. It is important that the extraction of knowledge from code be informed by extraction from text, with the most localized information being given the most attention. For example, a comment in a specific line or section of code is potentially more meaningful and useful than general documentation of the code. Code documentation, in turn, might be considered before general publications. Also, where there is associated code and text, the text extraction may in turn be aided by the model extracted from the code.

Another guiding principle might be that knowledge from various sources is aligned. For example, it may be important to know when a concept referenced in multiple sources is the same concept and when it is not. This consideration may come into play on a continuing basis as new knowledge is extracted and reconciled with existing knowledge. It is noted that the alignment capabilities of OWL, i.e., owl:sameAs, owl:differentFrom, are useful in following this principle.

Another guiding design principle may be that provenance may be captured and credibility assessed. Knowledge curation involves having a knowledge of the origin of each piece of knowledge. For example, when the same knowledge is found in multiple sources its credibility is increased and when sources are found that are contradictory, credibility is decreased. A knowledge-based system herein may be able to tell a user not only what is known or inferred, but also from whence it is known and how credible it is believed to be.

Yet another guiding principle regarding a system architecture herein is the context of each piece of extracted knowledge. Oftentimes, knowledge captured in both code and text makes a certain number of assumptions implicitly. Humans knowledgeable in a domain intuitively may be aware of these assumptions and might conform to them unconsciously. Using a forward reference in, for example, a Speed of Sound use case, a Mach number computation might use the speed of sound in the air through which the aircraft is traveling, not just the speed of sound in any arbitrary location or condition.

To allow a more concrete illustration of the system design and the functionality of each of a system's components herein, a webpage (e.g., NASA Glenn Research Center's "Speed of Sound" Web page) is used as an illustrative example of a source for knowledge curation. This page discusses the manner of travel of sound through a gas such as air and the properties of the gas upon which it depends. It further differentiates between the speed of sound in a calorically perfect gas and a calorically imperfect gas, with different but related equations for each. A Java applet that computes the speed of sound in air and the Mach number of an aircraft at a given speed and altitude, or the speed of the aircraft given its Mach number and altitude can be downloaded from the page. In some aspects, this web page has enough complexity to provide a variety of illustrative examples. It is noted that since this page is related to other pages on the NASA Hypersonics Web site, it can be expanded upon to include related science knowledge.

Figure 2:
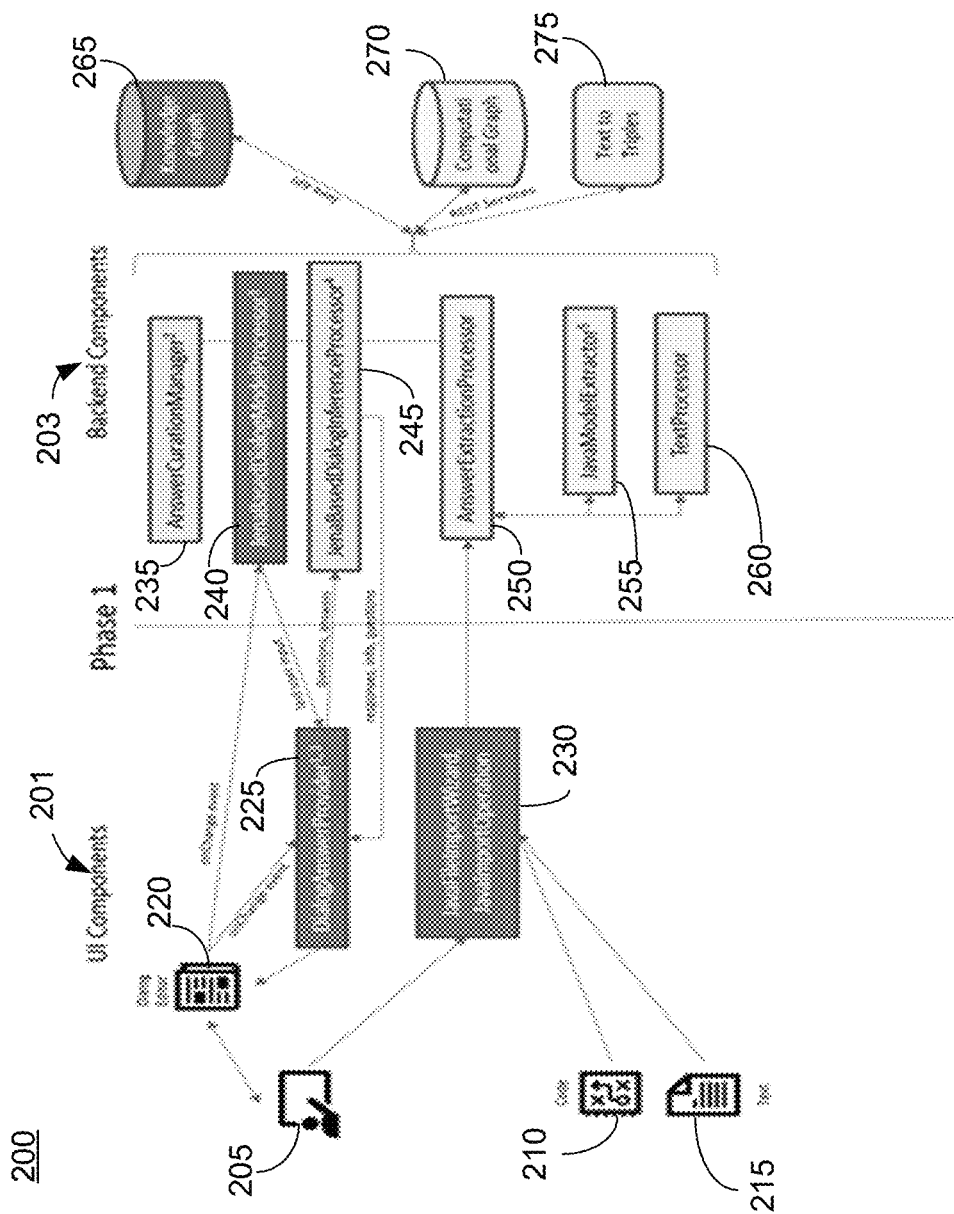
FIG. 2 is an illustrative depiction of an example architecture for a system, in accordance with some embodiments herein.

An overall system architecture for a system herein is shown in FIG. 2. In an effort to leverage some existing capability, system 200 is built as a set of Eclipse plugins (where Eclipse is an open source software collaboration and innovation environment). These plugins and components are broken down into UI components 201 on the left and backend components 203 on the right of FIG. 2. The backend components may be user-interface independent and can be used with, for example, a Web browser-based user-interface.

Applicant(s) have found controlled-English to be an effective way to allow [English-speaking] humans to build and to view and understand semantic models. In particular, the Semantic Application Design Language (SADL) implements a controlled-English grammar with expressivity of OWL 1 plus qualified cardinality constraints from OWL 2, as well as rules. It also supports queries, along with tests, explanations, and other model maintenance aids. The SADL grammar and integrated development environment (IDE) is implemented using Xtext, where Xtext is a framework for development of domain-specific languages. Applicant(s) have created the Dialog language as an extension of the SADL language. The Dialog grammar enables the user to create a Dialog conversation in a Dialog Editor window and specify a knowledge graph to serve as the domain of discourse. Once created, the Dialog's OWL model, which extends the selected domain model with any new knowledge captured in the conversation, is usable for query and inference and, if saved by the user, is saved both as a file in the Eclipse project with the ".dialog" extension and as an OWL file that contains the domain reference and the new knowledge. The user and Dialog Editor window 205 are shown in the upper left corner of FIG. 2. New or modified content in the Dialog Editor 220 is passed to both the UI component DialogAnswerProvider 225 and the backend component JenaBasedDialogModelProcessor 240.

While in a fully-functional system, code and associated text, publications, etc., might be found and extraction initiated by the curation manager through use of a Web bot or some other search mechanism over some set of potential sources, in the architecture of FIG. 2 the user may initiate extraction from code and text through the UI component JavaFileImportWizard and the associated JavaImportOperation 230. The import operation is carried out by the backend component AnswerExtractionProcessor 250. This component makes use of the TextProcessor 260 and JavaModelExtractor 255 to extract information from text and code. Either extractor can use tentative OWL models extracted by the other and may oftentimes use the Knowledge Graph 265 and Text to Triples 275 services. The knowledge graph 265 may be accessed via a Java API utilizing Apache Jena, where Apache Jena is an open source Java framework for building Semantic Web applications, while Text to Triples 275 is accessed via a REST service interface, where REST is a type of web service. In some aspects, during extraction a user might be consulted to resolve issues, answer questions, or interact in any way desired by the extractor and supported by the Dialog grammar.

Still referring to the system overview in FIG. 2, a K-CHAIN computational graph (CG) 270 may be extended whenever a model containing useful scientific knowledge is identified and validated for inclusion. To be added to the CG 270, the scientific model may either have an equation or have data from which a data-driven model may be trained. Once created, a model may be extended by adding an equation, if it doesn't already have one, and/or data. The CG 270 may be implemented using TensorFlow in Python to capture computations and creates a language-neutral representation of the model for training, inference, and model composition.

In some aspects, a mixed-initiative human-computer interface might require that a listener that "hears" what the user says to initiate an interaction is not the same thread as the processor that is working and may at any time initiate an interaction from the computer side. Otherwise, the conversation would always be controlled entirely from one side. In some instances, the Dialog Editor 220 may serve as a "chat window" for input from either side and thus may include an appropriate level of synchronization to make sure that messages are not intermingled. This type of architecture for mixed initiative interaction may be used because it is inexpensive to implement and integrates well in the Eclipse Xtext environment where other existing controlled-English elements are also used. For example, any domain concept used in the Dialog editor window, whether coming from the user or the system, might be colored by semantic type and hyperlinked to the content in the knowledge graph's ontology where it is defined, as well as to other places where it is referenced.

In some aspects, the design of the system in FIG. 2 may place as much of the system implementation as possible in the backend so that the UI components may be replaced, if desired, with as little impact as possible to the backend components that implement the rest of the architecture. In some aspects FIG. 2 demonstrates the utility of mixed initiative in placing the human as eminently in the loop as needed without a need to commit resources to designing a state-of-the-art mixed initiative interface.

The key in our proof-of-concept system is that the statements (or questions) that initiate a collaborative exchange are annotated with their location in the document, and the response from the other party is inserted into the document right after that location. With appropriate synchronization so that messages are not intermingled or lost, the result will be a series of interactions, initiating statement followed by the other party's response, regardless of who initiated the interaction. System messages, whether initiation or response, are prefixed with "CM" for "Curation Manager", but this can be modified or perhaps enhanced to identify the specific part of the ANSWER system that is the source of the statement.

To illustrate some aspects of the system, consider a very simple ontology that defines a circle and adds a rule to compute the area given the radius.

uri "http://sadl.org/model.sadl" alias mdl.
Circle is a class described by radius with values of type decimal,
described by area with values of type decimal.
Rule AreaOfCircle: if c is a Circle then area of c is PI*radius of c^2.

Now suppose that we open a Dialog window, import the simple model above, and ask a question about our domain.

uri "http://darpa/test" alias tst.
import "http://sadl.org/model.sadl".
What is a Circle?
CM: Circle is a class
described by area with values of type decimal,
described by radius with values of type decimal.

We might also wish to give the system a specific instantiation of a circle and get computed information about it.

uri "http://darpa/test" alias tst.
import "http://sadl.org/model.sadl".
UnitCircle is a Circle with radius 1.
What is UnitCircle?
CM: UnitCircle is a Circle with radius 1, with area 3.1415927410125732.

The Dialog grammar supports more specific questions, such as "What is the area of UnitCircle?" and may be extended as needed to allow a richer interaction as we discover what kinds of interactions are most useful. Extensions will be informed by the GE ASKE TA2 team.

Regarding extractions from code, Applicant(s) chose the NASA Hypersonics Web site as an illustrative domain of demonstration, with a focus on the Speed of Sound page with its downloadable class Mach.java that extends JavaApplet. What has emerged is a detailed approach to extraction from code. The Java Applets on the NASA Hypersonics Web site in general, and Mach.java in specific, have characteristics that make extraction somewhat difficult. However, these same difficulties allowed the identification of challenges and motivated the design of solutions to overcome them. These characteristics might not be unique to this code and may very likely be encountered in many scientific codes in different languages. Of note, they include the following characteristics.

(1) The code has very few comments (since there are so few, and we may create some comments to better demonstrate the important capability of using in-code comments during extraction of scientific models).
(2) top-level input and output variables are fields in the class with global scope and are not identified as to whether they are a model input or output or neither. The main method encapsulating the scientific model has neither input arguments nor a return value. The code snippet below shows some of the global variables and the main method signature.

```
double gama,alt,temp,press,vel,ttot;
double rgas, rho0, rho, a0, lrat, mach ;
double Q, TT, T, M, GAM, R, A, V, G ;
int lunits,vparam,tparam,ther,prs, planet;
int mode;
...
public void computeMach( ) {
...
```

(3) User-interface components are intermingled with scientific computation. For example, the outputs of the main computation method are passed to GUI widgets, e.g., the computed value vel is used in this line of code:
in.dn.o4.setText(String.valueOf(filter0(vel)));
This may be unusually common in this example code because it is a Java Applet, but the intermingling itself is certainly not unique to applets.
(4) Variables are assigned values by computation, and then the same variable is reassigned a value, e.g. in the code snippet below "vel" already has a value, is assigned a value (the comment suggests in ft/sec), then after a few lines is reassigned a value (the comment suggests in mph, which is apparently the same value it had originally).
V=vel=vel*88./60.; //v in ft/sec
temp=ttot−(gama−1.0)*vel*vel/(2.0*gama*rgas);
a0=Math.sqrt(gama*rgas*temp); //feet/sec
mach=vel/a0;
a0=a0*60.0/88.; //mph
vel=vel*60./88.; //v in mph
(5) The execution path through the main computational method is controlled by two flags set in the user-interface, one relating to the target computation output (object speed or Mach number) and the other to the input to be used (altitude or total temperature).
(6) The code apparently was once broader in scope. There are crumbs leftover from previous versions. For example, the variable planet (see code snippet in #2 above) never appears outside of its declaration.

In some embodiments, Applicant(s) have identified a multi-level approach to deal with these challenges. The overall approach is to use the abstract syntax tree (AST) generated by an existing parser. For Java, the Open Source Java Parser (see http://javapaser.org) is used to generate and expose the Abstract Syntax Tree (AST), although the Eclipse Java Development Tools (JDT) could also have been used. The generated AST allows us to "see" the overall structure of the code—the class or classes and the methods in the case of Java. Within a method, if there are arguments it may be assumed that these are inputs, and if there is a return value then it may be assumed that it is an output. These assumptions can be tested, or if there are no arguments and/or a returned value, input/output assumptions can be generated by looking at the sequence of computational statements in the method. If an argument variable first appears in the right-hand side (RHS) of an assignment statement or first appears in another kind of statement (e.g., a comparison), that validates the belief that the variable is an input. If a variable that has global scope first appears in the RHS of an assignment statement or first appears in another kind of statement, then it can be assumed to be an input to the method. For example, alt is a field in the Mach class (has global scope) and first appears in the computeMach method in this statement, from which we infer that it is an input.
if (alt<=36152.){//Troposphere
Similarly, if a variable is returned by a method then that variable can be assumed to be an output. However, in computational methods that do not return values, the situation is more ambiguous. When a variable is set by an assignment statement, that is the variable appears on the left-hand side (LHS) of the assignment, and the variable is not used in any subsequent statements, it can be presumed to be an output of the method. Yet a variable that is used in subsequent statements can still be an output. Either it may be used, after it is set, to compute other outputs, or, as in this present example, it may appear in an output that makes the value available in some destination, e.g., a0 in this statement is placed in a GUI text box.

in.dn.o3.setText(String.valueOf(filter0(a0)));

From the analysis of the AST, the system may categorize methods, variables, and statements or blocks of statements. In fact, the analysis of blocks of statements appearing within a control statement may be more effective in understanding the scientific meaning of the block of statements than an attempt to understand the control structure. For example, consider these two partial blocks that depend upon the flow control flag vparam.

if (vparam==1) {
temp=ttot/(1.0+0.5*(gama−1.0)*mach*mach);
a0=Math.sqrt(gama*rgas*temp); //feet/sec
a0=a0*60.0/88.; //mph
vel=mach*a0;
if (vparam==0) {
V=vel=vel*88./60.; //v in ft/sec
temp=ttot−(gama−1.0)*vel*vel/(2.0*gama*rgas);
a0=Math.sqrt(gama*rgas*temp); //feet/sec
mach=vel/a0;

It would be difficult, from analyzing the code that sets vparam, to determine what it means. But from looking at the input and output variables of the respective code blocks, one can reason that the first computes vel given mach, and that the second computes mach given vel.

In some embodiments, logic that analyzes code based on these characterizations of inputs and outputs, may be applicable beyond Java source code. To that end we will continue to try to separate the extraction of characteristics from the AST from the reasoning applied to the extracted characteristics. Accordingly, Applicant(s) foresee applying the same logical analysis to other languages.

Once a block of statements has been determined to be a scientific computation, a next level is initiated. Rather than create a new translator to convert the code block into the target language, we opt to reuse existing translators. This architecture might support the addition of other languages by plugging in existing translators, reducing substantially the effort needed. In one case, where the source is Java and the target is Python, a promising translator may be found in the github project java2python(See https://github.com/natural/java2python). While there may be Java source code for which translation at the class (.java file) level would be useful, such is not the case with our selected code source. Rather, the most useful translation will be, in the case of the top-level computational method computeMach, at the block-of-statements level. In some aspects, a system or process might wrap any block of Java statements in a pseudo method with the identified inputs and outputs, and wrap that in a simple class container. After translating this to Python, we can extract the desired Python method and use it as the model extracted from code and add it to the K-CHAIN computational graph. In the case of lower-level methods in the Mach class, which are called from our identified code blocks, they can be translated separately or be placed in the same pseudo Java class for translation. In either case, the result is a set of equations extracted from the Java code, translated to Python methods, and added to the computational graph with semantic metadata characterizing the model(s) added to the knowledge graph. More about the semantic characterization will be described below.

Figure 3:
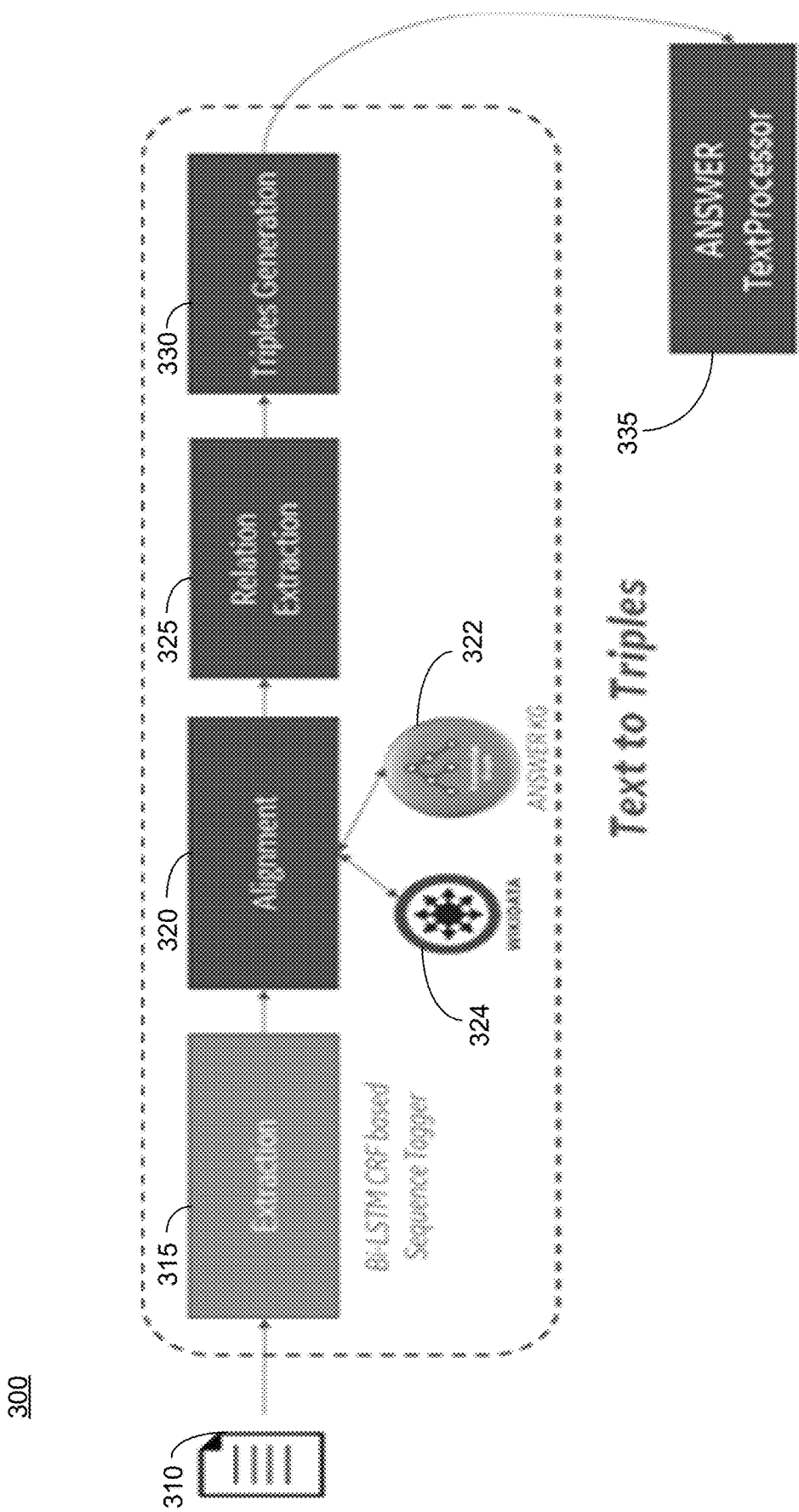
FIG. 3 is an illustrative depiction of an example "Text to Triples" module, in accordance with some embodiments herein.

In some embodiments, as illustrated in the system architecture 300 of FIG. 3, text processing begins with the Extraction module 315 that identifies and extracts scientific concepts and equations of interest in text 310. An Alignment module 320 further reconciles the extracted concepts with the existing ones in the system's knowledge graph. If no match is found, the alignment module 320 attempts to search for existing concepts in external knowledge graphs 324 such as, for example, Wikidata. After the alignment process is complete, the Relation Extraction module 325 identifies relations that may exist between the extracted concepts. Finally, the concepts, equations and relations are represented in the appropriate triple format using classes and properties from the supporting ontology. Text to Triples generation module 330 returns the generated triples to the system's TextProcessor module (e.g., FIG. 2, 260).

We now describe the development of the extraction module 315 including details such as, for example, the generation of training and test data, training a sequence tagging model, and preliminary evaluations including an independent evaluation over the Speed of Sound webpage.

Figures 4, 5:
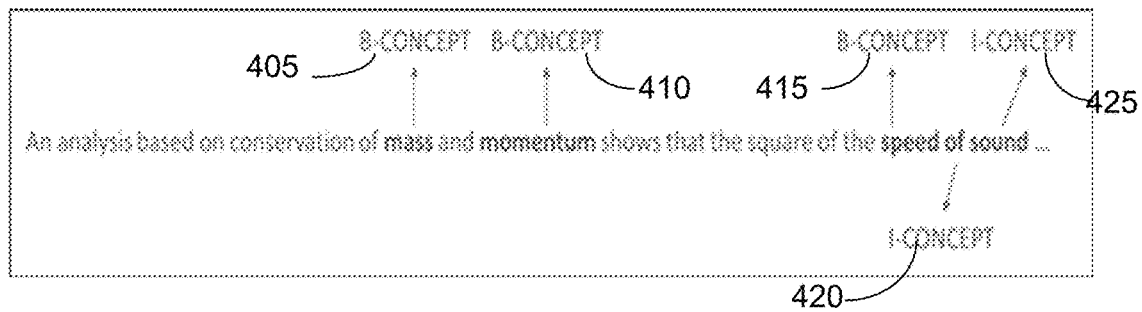
FIG. 4 is an illustrative depiction of text tagged to illustrate concepts, in accordance with some embodiments herein.
FIG. 5 is an illustrative depiction of extracted text including represented concepts, in accordance with some embodiments herein.

The extraction module 315 treats the problem of identifying scientific concepts and equations in text as a sequence tagging task. Sequence tagging, in natural language processing (NLP), involves tasks such as assigning a grammatical tag to each word (part of speech tagging), grouping words into phrases (chunking) and assigning an entity type to a group of words (named entity recognition). The task of tagging scientific concepts and equations in text is akin to a sequence tagging problem, in which the goal is to tag every token in a sentence as either belonging to a scientific concept or equation. FIG. 4 shows an example output of sequence tagging task applied on a sentence from the Speed of Sound webpage. The example shows extracted scientific concepts (example for equations can be found further in this section).

Regarding the generation of training data, some typical architectures for sequence tagging are supervised in nature and need sufficient training data for the models to be trained. In some embodiments herein, we generate the required training data by automatically annotating some text corpus of webpages and/or documents. Annotating the text corpus of webpages and/or documents involves two steps. In the first step, a dictionary of known scientific physical concepts may be manually created. This dictionary of concepts is then used along with, for example, Apache's UIMA Concept-Mapper, to identify and annotate scientific concepts in pages in the text corpus of webpages and/or documents. The identified concepts are used as ground truth annotations for both training and test datasets.

The scientific concepts dictionary are created by extracting all the titles for Wikipedia pages that are classified as "Physical Quantities". These titles are represented as concepts in a semantic model using SADL. Each concept is assigned a unique uniform resource identifier (URI) along with its possible synonyms. The advantage of representing them in SADL is that it will allow domain experts in the future to tweak and extend the "dictionary" as and when necessary. Please note, the current SADL model is an initial model. This model may be updated to include relation between the Physical Quantities in here with the concepts in the supporting ontology (e.g. relations such as subclass of ScientificConcept and/or UnittedQuanitity). FIG. 5 is an illustrative depiction of some "Physical Quantities" extracted from Wikipedia.

The OWL file generated by SADL is further translated into the UIMA ConceptMapper dictionaries in XML format. Each of the concepts in the ontology is translated into its canonical form and the variants for the dictionary format. Canonical form of a concept is represented by its URI, while its variants include the aliases. The ConceptMapper pipeline searches for and identifies the presence of canonical forms and variants from the dictionaries in the given text. It's able to provide accurate mappings between the content in the text and terms in the dictionaries, essentially performing a complex dictionary lookup.

Once the annotation process is complete, each sentence is tokenized and assigned the appropriate Inside-Outside-Beginning (JOB) tags (FIG. 4). "I" indicates the token 420, 425 is inside the class (e.g. in our case its either a scientific concept or equation), "O" indicates the token is not of interest (or outside the class) and "B" indicates the token 405, 410, 415 is the beginning of the class. The IOB tags for scientific concepts are assigned based on the ConceptMapper annotations, whereas the ones for the equations are assigned manually. The data is further randomly split, in some embodiments, with $2/3^{rd}$ of the corpus into a training set and the remaining into a test set. In some embodiments, depending, for example upon a specific situation and/or use-case, the split of data between training and testing may be varied.

The annotated data may be used to train a supervised sequence tagging model. Recently, neural network architectures have been able to match or surpass the state of the art for several NLP tasks including sequence tagging. Herein, we utilize the bidirectional Long Short-Term Memory (BI-LSTM) with a Conditional Random Field (CRF) layer (BI-LSTM-CRF) architecture that can produce state of the art accuracies for named entity recognition.

Herein, we use the BI-LSTM-CRF implementation provided as part of the flair framework. Text data is mapped into a vector space before it can be processed by the neural network and with the advent of deep learning, embeddings (or dense vector representations) have become one of the most popular techniques to do so. More recently, the idea of "Stacking Embeddings" or combining different types of embeddings to produce a single vector has shown promising results in sequence tagging tasks. The idea behind stacking embeddings is to concatenate embedding vectors from different sources to produce a single vector. Herein, we map our text data into a dense vector by stacking two different embeddings. In some embodiments, we use a pre-trained model of the popular GloVe word embeddings and stack it with Character embeddings trained for our specific task. Some reasoning behind using character embeddings is to support the equation tagging task—equations are made of up of more characters than words. The flair framework provides an easy option to specify the different embeddings that one wishes to stack. When character embeddings is provided as one of the options, flair automatically trains it during the downstream task training (in this case, during the sequence tagger training).

In one embodiment, the sequence tagging model was trained with 256 hidden states and 1 LSTM layer. The initial learning rate was set to 0.1 and the maximum number of epochs to 150. Flair employs a simple learning rate annealing method in which the learning rate is halved if training loss does not fall for 5 consecutive epochs. It chooses the model that gives the best F-measure in the best epoch as judged over the test data set.

The sequence tagging model herein was trained over the training and test set created from the text corpus of webpages and/or documents. The training stopped after 95 epochs as the learning rate become too low. FIG. 6 shows a preliminary performance of the model over a test data set created from the text corpus of webpages and/or documents.

The model performs well over the test data set with high accuracies for identifying both scientific concepts and equations. These are "initial" results since they might be optimized through a number of operations. Options include evaluating with different training rates, different combination of embeddings etc. The current accuracy numbers are also a function of the scientific concepts dictionary that was used to automatically annotate the training and test data sets. Valid concepts that are absent from the dictionary and appear in text do not get counted as missed concepts (nor were they used during training). A human evaluation (albeit on a smaller scale) may be performed to estimate how many such concepts may have been missed. The bias of the model may also be evaluated. The current model has been trained and evaluated over the NASA corpus. The model's generalization may be further demonstrated by evaluating the model over scientific articles from different sources (e.g. different websites and publications).

The above-described model was used to annotate concepts and equations on the Speed of Sound webpage, which was neither part of training or the test data set. This example use-case helped to both validate the performance of the model as well, as identify challenges and areas for optimization.

Firstly, the model was able to accurately tag both of the equations that appear on the page, as seen in FIG. 7. The <B-EQUATION> tag indicates the start of the equation and every subsequent <I-EQUATION> tag indicates that the preceding token is part of the equation.

The model was able to also identify several relevant concepts from the page such as mass, momentum, temperature, and, speed of sound to name a few, as shown at 805 and 810 in FIG. 8. The model was able to identify some partial concepts. For example, although the model was not able to extract "speed of transmission", it was able to go so far as "speed of", as demonstrated by the extracted partial concept at 815. Partial concepts like these provide an opportunity for a human collaborator to intervene and provide feedback to the system.

In some aspects, this model might be further optimized, for example, regarding the development of the Alignment module (FIG. 2, 320) followed by Relation Extraction module 325 and Triples Generation module 330.

In some embodiments, a text extraction module herein may extract an equation context in the form of equation arguments and return variables. It may also map the arguments and variables to existing concepts in text and external sources such as, for example, Wikidata. In some aspects, an implementation might include heuristic rules to associate equation arguments (T) and variables ($a^2$) with concepts (temperature, speed of sound). Heuristics may include rules such as, for example, the token that appears right after a scientific concept in the neighborhood of an equation (e.g., +/−k lines around the equation) is likely to represent the concept in an equation. This aspect may be confirmed by the token's presence in the equation. Another illustrative rule involves the use of a "chunker". The "chunker" or a phrase extractor may function to identify all noun phrases in +/−k lines around the equation on the basis that noun phrases in which the equation variable appears are also likely to represent the scientific concept associated with the variable.

As an example, consider the following sentence from a Speed of Sound webpage on previously introduced text corpus of webpages and/or documents (e.g., a hypersonic index):

An analysis based on conservation of mass and momentum shows that the square of the speed of sound a^2 is equal to the gas constant R times the temperature T times the ratio of specific heats gamma a^2=R*T*gamma Notice that the temperature must be specified on an absolute scale (Kelvin or Rankine).

Scientific concepts extracted by the sequence tagging model—speed of sound and temperature are followed by tokens a^2 and T. These tokens appear in the equation that follows the sentence, thus allowing the rule to infer that a^2 is speed of sound and T is temperature. The mapping between variables and concepts provides the necessary context for the equation. This context is not only useful in interpreting the equation but is also useful in augmenting additional knowledge to the scientific model extracted from code. The code model can use this information to inquire and get additional context about variables that appear in code, with little or no information.

In some aspects, certain information might be valid only in a correct context. This may be especially true in the context of scientific knowledge represented in code and text. For example, the variable T might mean temperature in one context whereas it could represent Torque in a completely different context. Hence, the knowledge extracted from text may be represented in its own contextual sub-graph, instead of, for example, merging it in one global graph. For instance, all knowledge extracted from a Speed of Sound webpage might be stored under a local graph http://kdl.ge.com/darpa/aske/speedofsound. Doing so might facilitate and/or allow the Speed of Sound code model to make contextual queries against this graph. Example(s) of such queries include information about certain variables that may appear in code with little or no context. In one embodiment, the equation-VariableContext service might provide this functionality. As shown in FIG. 9, the code model can query for a variable context by providing the local sub-graph URI and the variable string it wishes to learn more about.

In some embodiments, the equationVariableContext service provides context in the form of all matching variables and when possible, their associated concepts with Wikidata alignment and the equations in which the variables appear. In some aspects, the Mixed Initiative mode may facilitate or allow the code model to work collaboratively with the human to select the right context, as illustrated in part by FIG. 10.

In some aspects, the extraction of equations may be relatively easy compared to understanding their meaning by understanding the scientific concept represented by each input and output. It is noted that a human looking at the code might also have difficulty—unless the equation is already part of the person's knowledge, they might likely understand the operations that are being performed but might find it impossible to relate the computations to anything in the real world. Consider, for example, this statement from Mach.java.

a0=Math.sqrt(gama*rgas*temp); //feet/sec

The Java AST allows us to see the comment, "feet/sec", and associate it with the statement. If the code extractor were to query the Text to Triples service for the meaning of this comment, one might expect to get back something like what is found if one does a Google Search on exactly that phrase. The second reference is a Wikipedia page which begins with this statement.

"The foot per second (plural feet per second) is a unit of both speed (scalar) and velocity (vector quantity, which includes direction). It expresses the distance in feet (ft) traveled or displaced, divided by the time in seconds (s, or sec).[2] The corresponding unit in the International System of Units (SI) is the metre per second."

Or, we might expect a good ontology, such as qudt (See, http://qudt.org/), to already include this knowledge. In either case, the units give us a hint that a0 might be speed. But speed of what we have not yet deciphered from the code.

There are more hints in code comments. In the file header we find the following comment.

"Mach and Speed of Sound Calculator Interactive Program to solve Standard Atmosphere Equations for mach and speed of sound Calorically imperfect gas modeled for hypersonics"

If we look at where rgas is set, which can be determined from the AST, we find the following statement.

//Earth standard day
rgas=1718.; /*ft2/sec2 R*/

The value and units in the comment on the line, along with the preceding comment, might be enough to identify the concept in one of several scientific concept definition repositories. In one instance, the first hit of a google search on "1718 ft2/sec2 R" has yielded the following summary sentence.

"R is the universal gas constant, 1.995 m2/sec2 K or 1718 ft2/sec2 R."

In fact, as sparse as comments are in this code, they can be a useful addition to the documentation found in the Speed of Sound Web page. In this text we find the equation.

$$a\hat{}2=R*T*\text{gamma}$$

which is preceded by text which reads, in part,

"the square of the speed of sound a^2 is equal to the . . . gas constant R times the temperature T times the ratio of. specific heats gamma"

where the bold font is in the original text. However, several inferences are necessary to reconcile the equation from code with the equation from text:

gama is the same as gamma
rgas is the same as R
temp is the same as T
a0 is the same as a
Math.sqrt(a^2) is the same as a
Multiplication is commutative: R*T*gamma is equivalent to gamma*R*T Given the potential difficulty of drawing all of these inferences reliably, this example demonstrates the utility of a human in the loop. Whether by the suggested inference chain, or because a machine-learning approach finds a similarity between the equation in code and the equation in text, our mixed initiative approach disclosed herein provides a mechanism for the system to ask the user for final verification. Such verification might begin with something like, for example, where the links would open a window on the respective sources:

CM: Is equation "a0=Math.sqrt(gama*rgas*temp)" (see code-link) the same as "a^2=R*T*gamma" (see text-link)?

In some embodiments, a coordinated effort includes extraction from code, extraction from text, and interaction with the human. The model created by (1) extraction from documentation can provide context to the extraction from code and comments in code. Likewise, (2) extraction from code can inform extraction from associated documentation. Wherein, (3) an iterative, bootstrapping approach may prove useful in difficult situations.

In a dataflow graph, the nodes represent units of computation, and the edges represent the data consumed or produced by a computation. Dataflow graphs have several advantages that machine learning packages, such as, TensorFlow, leverage when executing models including: (1) identifying operations that can execute in parallel, (2) distributed execution on different hardware, (3) hardware-specific compilation for faster execution, and (4) portability. It is important to note that portability herein implies the dataflow graph generated by the framework herein is a language-independent representation of the model. Thus, we can build a dataflow graph in Python, store it locally, and restore it in a C++/Java program for low-latency inference. Due to developments in the deep learning community, automatic differentiation is also available in such packages, which allows the encoding and computing with differential equations on computation graphs. Recently Probabilistic Programming in TensorFlow Probability has also introduced Bayesian inference to characterize uncertainty in the model. Because of these powerful attributes, some embodiments herein use TensorFlow Graph to represent the computational models. However, it is noted that the curation manager and extraction modules are agnostic of the computational modeling framework. The implementation via RESTful web services provides modularity and enables future interaction with other modeling approaches and packages, such as dynamic Bayesian networks, grounded function networks (GrFNs), etc. as long as RESTful services can be created to with a compatible interface.

Figure 11:
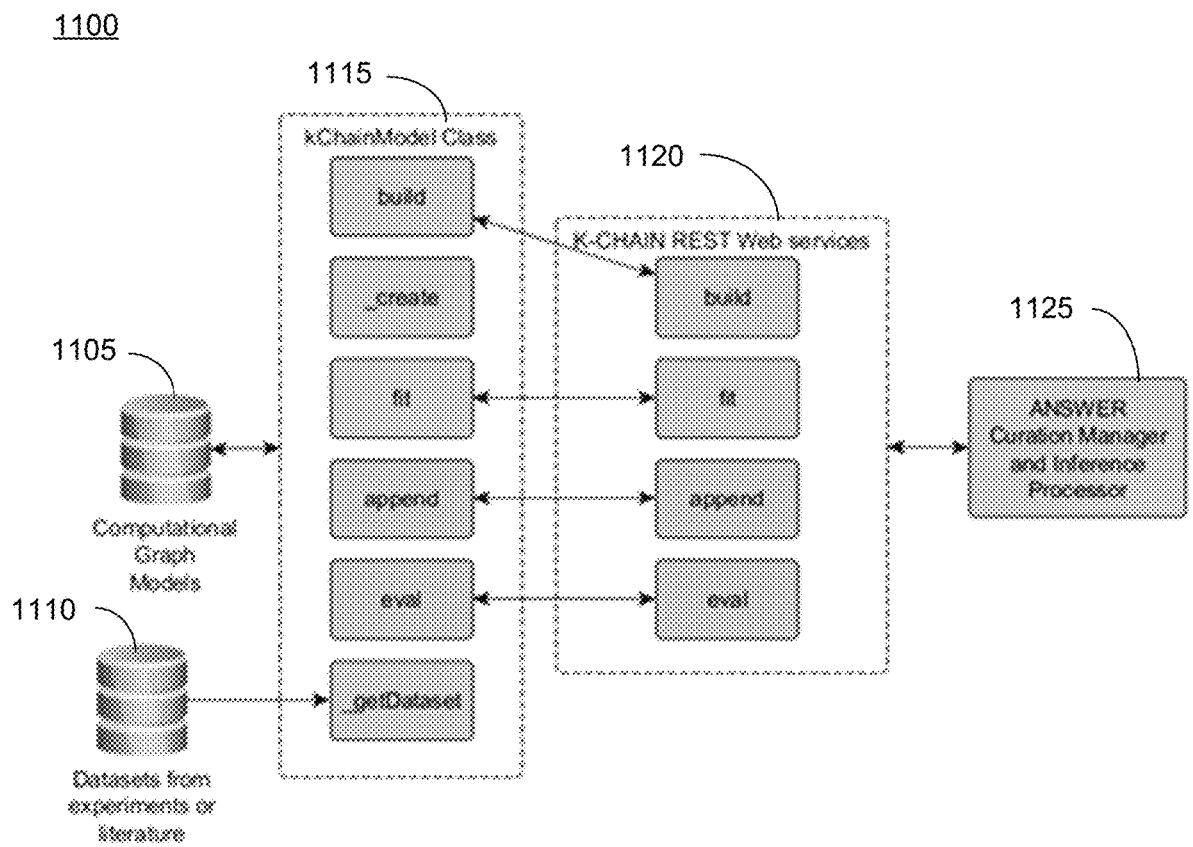
FIG. 11 is an illustrative depiction of an example of architecture for computational graph modeling and execution, in accordance with some embodiments herein.

In some aspects, the computational model creation and evaluation is provided as a web service, which interfaces with the curation manager and inference processor. The architecture of the implementation is shown in FIG. 11. The web service utilizes the "K-CHAIN library" (i.e., kChain).

Referring to FIG. 11, the kChain library includes of kChainModel class 1115, which includes various methods to build, fit, and evaluate models, as well as compose disparate computational models based on data sources 1105 and 1110. The K-CHAIN web service 1120 is utilized to build a model in at least the following two cases. (1) An equation representing a relationship between semantically-meaningful scientific concepts is available from code or text or provided by user, or (2) A dataset is available consisting of variables that are semantically-meaningful scientific concepts and are known to have a "depends" or "causes" or similar relationship. Herein, semantically-meaningful scientific concepts refer to those variables that are grounded in the knowledge graph of the domain as objects of type ScientificConcept.

In case of exact knowledge (case 1), if a dependency of speed of sound upon temperature of medium (air/gas) and other properties of gas (molecular weight, specific heat capacities, etc.) is extracted from text and/or code, a computational model can then be created directly as well. On the other hand, an example of the imperfect knowledge (case 2) from the NASA Speed of sound page is as follows: " . . . the temperature depends on the altitude in a rather complex way". Here the scientific concept of temperature is known to be dependent on the concept of altitude, however the relationship is not available. If through the context of surrounding text and/or with human interaction, the system can infer that temperature here refers to 'temperature of the atmosphere' or 'temperature of air', then concepts can be incorporated and aligned with the knowledge graph. Additionally, if a dataset with observations of those semantic concepts becomes available (e.g., either via experiments or during literature search), then the build service can be utilized to create a data-driven model relating those concepts.

To illustrate use cases of the build service, we will now show three demonstrations with a simple example from Newton's Second Law.

```
Input:
{'inputVariableNames': ['Mass', 'Acceleration'], 'outputVariableNames': ['Force'],
'dataLocation': None, 'equationModel': None, 'modelName': 'Newtons2LawModel'}
Output:
{"modelType": "NN", "trainedState": 0, "metagraphLocation":
"Models/Newtons2LawModel"}
```

In this example, equationModel is given as None as in this case F=m*a is not known to the system a priori and dataLocation is None as a suitable dataset has not been identified. The service parses the json object and calls the kChainModel.build( ) method. This method internally uses_create method to construct a neural network model as a TensorFlow graph with input variables named using inputVariableNames and output variables named using outputVariableNames. The resulting graph is stored as a MetaGraph (MetaGraph in TF: https://www.tensorflow.org/api_guides/python/meta graph) object by TensorFlow and the location of that MetaGraph is returned as an output of the_create method. The output indicates that the model created is a neural network (NN), which is not yet trained, and the MetaGraph location is provided for future use of the model. Ideally, Curation Manager will use the build service only if equationModel or dataLocation is available. We will see these two cases next.

In this next example to build a model using a dataset, a dataset for Force, Mass, and Acceleration concepts called 'Force_dataset.csv' is created or becomes available, then the dataset location can be specified to create and fit the model using the build service as follows:

Input:
{'inputVariableNames': ['Mass', 'Acceleration'], 'outputVariableNames': ['Force'],
'dataLocation': 'Datasets/Force_dataset.csv', 'equationModel': None, 'modelName':
'Newtons2LawModel'}
Output:
{"modelType": "NN", "trainedState": 1, "metagraphLocation":
"Models/Newtons2LawModel"}

In this execution after the model is created using _create method or _createNNModel method to be precise, the dataset may be retrieved by using the _getDataset method. In the fit method, the model is revived from the MetaGraph and computational nodes necessary for training the model, such as for loss function and optimizers, are appended to the graph and training is performed. It is noted that in the output, the trainedState is now switched to True or 1. The resulting trained model with parameters and weights is saved back as a MetaGraph.

In lieu of the dataset, a more likely scenario may be to find the equation for that relation in code or in text. In those scenarios, the build service is used with the equation. There are several ways of sharing the equation model to create the computational graph. One of the approaches is illustrated below:

Input:
{'inputVariableNames': ['Mass', 'Acceleration'], 'outputVariableNames': ['Force'],
'dataLocation': None, 'equationModel': 'Force = Mass * Acceleration', 'modelName':
'Newtons2LawModel'}
Output:
{"modelType": "Physics", "trainedState": 0, "metagraphLocation":
"Models/Newtons2LawModel"}

In this example, the demonstration is set as if the equation was extracted from text and all relevant concepts were incorporated or already known in the knowledge graph. If a code snippet was extracted from Java, then java2python translators (as mentioned in extraction from code section discussion above) will provide Python multi-line code snippets or functions, which can be provided as formatted strings in a similar way. The build service calls the build method and then _createEqnModel method to create the computational model for the equation. The output of this service is a TensorFlow model to perform that computation that can be executed using the eval service. These models are created by defining new Python methods from equation strings and then wrapping those methods as TensorFlow computations using tensorflow.py_func( )(Documentation for py_func: https://www.tensorflow.org/api_docs/python/tf/py_func)functionality. Additionally, some embodiments also leverage a package in TensorFlow called AutoGraph (e.g., Introduction to TensorFlow AutoGraph: https://www.tensorflow.org/guide/autograph?hl=en), which provides basic functionality to create TF graph from native Python code including conditionals and loops.

In summary for the example build service, the I/O interaction JSON is given in Table 1 below. The build service may be updated to provide input and output variables as a list of json objects, so that name, type, and default attributes with corresponding variables can all be included without ambiguity. For example: "inputs": [{"name": "a", "type": "double"}, {"name": "b", "type": "double"}]. The degree of fitness in Table 1 is currently a placeholder to report accuracy and other metrics of the fitted model.

TABLE 1

| Input to the build service | Output returned by the build service |
|---|---|
| {<br>  "inputVariableNames": ["a", "b"],<br>  "outputVariableNames": ["c"],<br>  "dataLocation": "URIString",<br>  "equationModel": "string",<br>  "modelName": "URIString"<br>} | {<br>  "modelType": "someTypeVal",<br>  "trainedState": true,<br>  "metagraphLocation": "somePath",<br>  "degreeFitness": [1.10, 2.20]<br>} |

In the K-CHAIN model RESTful web services (e.g., FIG. 2, 270), the fit service is also directly available to update parameters of an existing model with a new dataset. The fit service utilizes the fit method of kChainModel Class. Due to modularity of the implementation, the fit method is internally used in the build method as well to train new models with any available data. The key-value pairs in the JSON object are a subset of pairs given for the build service. An example summary of input-output JSON interface for a fit service is shown in Table 2.

TABLE 2

| Input to the fit service | Output returned by the fit service |
|---|---|
| {<br>   "modelName": "URIString",<br>   "inputVariableNames": ["a", "b"],<br>   "outputVariableNames": ["c"],<br>   "dataLocation": "URIString"<br>} | {<br>   "trainedState": true,<br>   "metagraphLocation": "somePath",<br>   "degreeFitness": [1.10, 2.20]<br>} |

Figure 12:
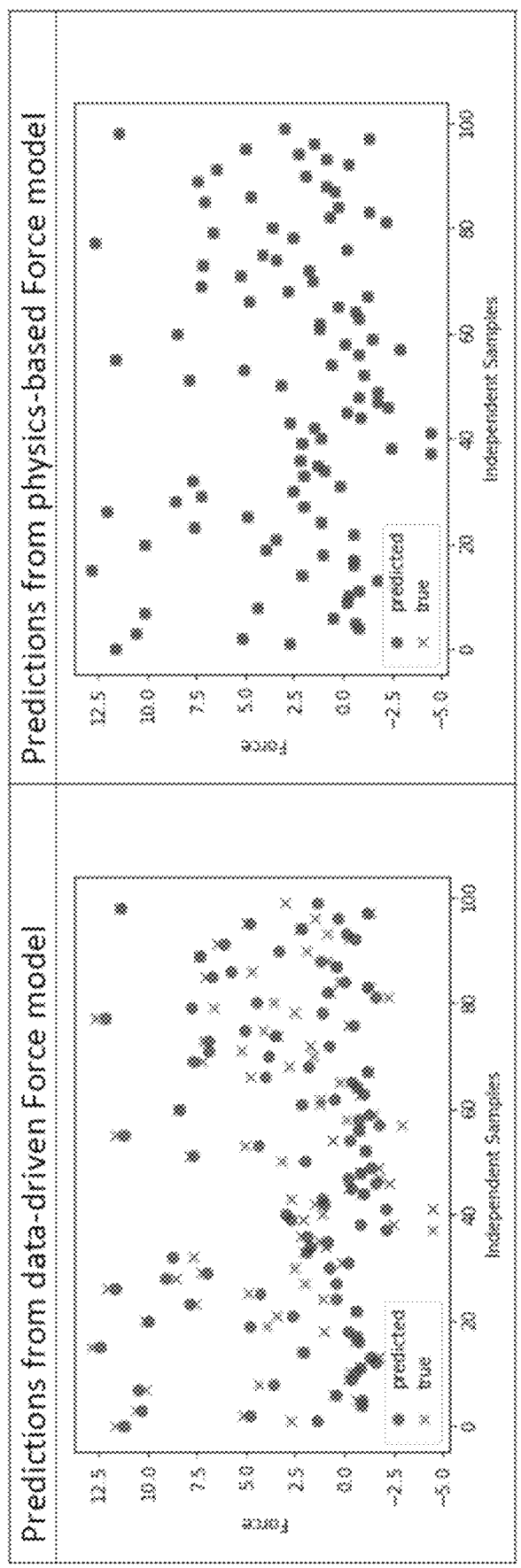
FIG. 12 is an illustrative depiction of an example eval service, in accordance with some embodiments herein.

In the eval service, any existing model irrespective of modelType, (i.e., physics or data-driven or hybrid) can be evaluated or executed for inference to create outputs of interest by providing relevant inputs. Unlike other services, this eval service will typically be requested by the system's Inference Processor instead of the Curation Manager, to provide quantitative outputs during mixed-initiative dialogues between system and user. In Demo 2 and Demo 3 above, a data-driven model for Force and a physics equation-based model for Force from Newtons $2^{nd}$ law was constructed. In FIG. 12, shown are outputs of running those models using the same inference functionality. Since the dataset was created via simulation, the physics model fits perfectly, whereas the data-driven model has some discrepancy. The eval functionality may be provided as a web service and incorporated as a part of kChainModel class.

In some embodiments, processes and systems herein might add a service and method to append concepts to existing computational models. This append service will add new concepts to an existing model and enables the growth of a model over time. In eval during session run time, the relevant subgraph will be automatically identified and executed for generating the relevant outputs. For example, an initial model with position, velocity, acceleration, mass, and force variables can append the concept of momentum to produce the final model. If the initial model was ModelType Physics and the concept of momentum is incorporated with an equation, then the final model is of ModelType Physics. If the KG consists of "momentum depends on mass and velocity" only, then the momentum model will be of type "NN" or "GP", hence final model will be Hybrid. If curation manager uses model "append" with an equation for the concept, then ModelType evolves as follows: Physics->Physics, Data-driven->Hybrid, and Hybrid->Hybrid. If curation manager uses model append without an equation for the concept, then ModelType evolves as follows: Physics->Hybrid, Data-driven->Data-driven, and Hybrid->Hybrid. The ability to create hybrid models with data-driven and physics-based components based on knowledge graphs has led to the name of Knowledge-Consistent Hybrid AI Networks or K-CHAIN. Note that the append service also allows one to create meta-models by merging multiple computations over similar variables with conditional statements denoting context. For example, the computation for speed of sound for a calorically perfect gas and for a calorically imperfect gas have the same inputs variables, but the equations are completely different. A manually-created computational graph for speed of sound is shown in FIG. 13.

In some aspects, embodiments herein may be expanded by adding the append capability to K-CHAIN service and library. Along with the addition of the append capability, we plan to incorporate some initial capability of guided-curation where the system infers that if a model is not trained, then it needs to look for datasets and if a model is data-driven, then it needs to look for physics equation within the page, code, or through Wikidata to refine the computational graph with a physics equation. Some embodiments may add probabilistic models to capture uncertainty in parameters of equations.

It is important to differentiate between curated knowledge, knowledge that has passed some threshold of assessment of reliability, and tentative knowledge, models that have been extracted from code and/or text and have not yet met the threshold to be added to the curated knowledge. This is one role of the AnswerCurationManager shown in FIG. 2. On the knowledge graph side, it is easy to store a model in an OWL ontology and annotate it as pending or curated, or provide it with a level of belief. However, sometimes the curation of knowledge may include exercising of the model and comparing computations with observations, so a pending model may also need to be instantiated in K-CHAIN.

As noted above, the backend agent of the system responsible for initiating dialog with the user must be running on a separate thread from the Dialog model processor. The curation manager might fulfill this task. In that case the design and implementation will allow other components such as the AnswerExtractionProcessor (e.g., FIG. 2, 250) to interact with the curation manager (e.g., FIG. 2, 235) to obtain feedback from the user.

In some embodiments, a curation manager that may be aware of gaps in the knowledge base, which include what is learned from queries that failed to produce the desired results, and models that have weak accuracy or credibility, and is able take direction from the user. From this awareness the curation manager should focus knowledge search over available sources to improve the knowledge store.

Before exploring the ontological commitments useful to the capture of scientific knowledge and identified under the present disclosure, we introduce some useful models that have been previously developed for use in SADL and will be used in ASKE.

The SADL grammar contains, with very high precedence so that grouping with parentheses is not needed, a construct called UnitExpression. This allows a numeric value to be followed by a unit designation. If the unit designation contains white space it must be quoted.

The result is that when a number followed by a unit designation occurs in a SADL statement, it is translated into OWL according to the meta-model defined in the SadlImplicitModel (a system-supplied model automatically loaded by all user-defined models in SADL).

UnittedQuantity is a class,
     described by ^value with values of type decimal,
     described by unit with values of type string.

Note that the "^" before value is necessary because value is also a keyword in the grammar. This definition generates the OWL meta-model snippet below, which allows both the value and the unit to be captured in an OWL model

```
<owl:Class rdf:ID="UnittedQuantity"/>
<owl:DatatypeProperty rdf:ID="value">
   <rdfs:domain rdf:resource="#UnittedQuantity"/>
   <rdfs:range rdf:resource="http://www.w3.org/2001/XMLSchema#decimal"/>
</owl:DatatypeProperty>
<owl:DatatypeProperty rdf:ID="unit">
   <rdfs:domain rdf:resource="#UnittedQuantity"/>
   <rdfs:range rdf:resource="http://www.w3.org/2001/XMLSchema#string"/>
</owl:DatatypeProperty>
```

This expressivity is important for capturing scientific knowledge because units are important in the expression of almost all scientific measurements and calculations. Most scientific concepts, e.g., force, mass, time, etc., will be subclasses of UnittedQuantity in our knowledge graph. For example, given the domain model PhysicalObject is a class described by weight with values of type Force.
   Force is a type of UnittedQuantity.
   One can then make the statement
   EmpireStateBuilding is a PhysicalObject with weight 365000 tons.

This statement generates the following OWL in the knowledge graph.

```
<tst:PhysicalObject rdf:ID="EmpireStateBuilding">
   <tst:weight>
      <tst:Force>
         <sim:unit rdf:datatype="http://www.w3.org/2001/XMLSchema#string"
         >tons</sim:unit>
         <sim:value rdf:datatype="http://www.w3.org/2001/XMLSchema#string"
         >365000</sim:value>
      </tst:Force>
   </tst:weight>
</tst:PhysicalObject>
```
where tst is the prefix for the current model and sim the prefix for the SadlImplicitModel.

In some embodiments, it appears that most equations captured in code are devoid of any unit considerations other than perhaps in comments. Equations in text will often identify the type of an argument, e.g., mass, in the surrounding text. The type of the argument implies a set of units that might be associated with any value. Certainly, the values that are assigned to variables as inputs to calculations are usually numerical values without any way to associate units. In the Mach.java code, for example, we have the following declaration of global variables in the calculation of Mach number or velocity.

double gama,alt,temp,press,vel;
   double rgas, rho0, rho, a0, lrat, mach;
   Similarly, in method definitions within the code, that are usually not explicit units.
   public double CAL_TT (double T, double M, double G, double Q) { . . . }

In other words, the problem of making sure that there are appropriate and consistent units for any calculation may be left as an exercise for the human applying the knowledge. Given that this is the case for one approach herein, units will be accounted for in the knowledge graph (in the semantic models) but not in the K-CHAIN computational graph. The requestor of a computation in the CG, whether programmatic or human, must make sure that the units of inputs are compatible and assign appropriate units to the output(s) of the computation. UnittedQuantity provides one of the ontological foundations upon which to build this capability.

More about our approach will be described in the Rules as Model Interfaces subsection below.

A central idea of a list is that its elements have an unambiguous order. Typed lists are essential to the application of semantic models to software verification and validation. Consider, for example, the modeling of a flight management system. The waypoints along the flight path constitute a list of waypoints. The order matters a great deal to the efficient journey of an airplane from origin to destination.

The vocabulary of OWL, our chosen representation for the knowledge graph in some embodiments, does not include a way of expressing typed lists. The less expressive RDF has a list construct, but since RDFList is used in the serialization of OWL itself, it is not easily used in creating domain models in OWL. Furthermore, RDF lists are not typed, and typing is of significance in error checking.

SADL implements an approach to typed lists that is internally consistent and allows lists to be built monotonically, both of which are missing from other approaches. The SADL grammar uses the List keyword, which can be added to any class or data type, to indicate that something is not a single instance of that type but a list of instances of that type. As a simple example, suppose one wished to capture the grades of each student taking a course. One could use a model without lists as follows.

CourseGrades is a class,
     described by course with a single value of type Course,
     described by student with a single value of type Person,
     described by score with values of type int.

This model allows an instance of CourseGrades to be the subject of multiple triples with predicate score and an xsd:int value. But what if we wanted to be able to answer questions like whether a student's scores trended up or down over the duration of the course? Then the following model in which the predicate score can have only one value, but that value is a list of values of type xsd:int, would be more useful.

CourseGrades is a class,
described by course with a single value of type Course,
described by student with a single value of type Person,
described by scores with a single value of type int List.

An actual instance of CourseGrades can be created with the following statement. As illustrated, the SADL syntax for the actual elements of a list are comma-separated values inside square brackets.

ThisExample is a CourseGrades with course Physics101_Fall_2017,
with student George
with scores [83, 85, 87, 93].

Like typed lists, there is no explicit OWL construct for representing equations. Therefore, in some embodiments we build a representation of the important information about equations in an OWL model. The SadlImplicitModel includes a metamodel for two different kinds of equation, one a subclass of the other. Both types include the equation's signature—the name and type of arguments that may be passed in and the types of values returned. They are differentiated by where the details of the computation, the equation body, may be found. In the SADL grammar, an Equation has a body which is expressed in the SADL expression grammar. This grammar includes math operations and list operations but does not currently support branching and conditional blocks. The serialization of this body is the value of the expression. An ExternalEquation in the SADL grammar, on the other hand, does not have a body but is a reference to an external computational entity that matches the given signature. Internally, an Equation is uniquely identified by its namespace and name. Only an ExternalEquation has an external reference, identified by the value of the property external URI. Optionally, an ExternalEquation may also have a location URL. Below is the SadlImplicitModel meta-model for equations.

^Equation is a class,
described by expression with a single value of type Script.
ExternalEquation is a type of ^Equation,
described by externalURI with a single value of type anyURI,
described by location with values of type anyURI.
Language is a class, must be one of {Java, Python, Python-TF, Text, OtherLanguage}.
Script is a class, described by language with a single value of type Language,
described by script with a single value of type string.
arguments describes ^Equation with a single value of type DataDescriptor List.
returnTypes describes ^Equation with a single value of type DataDescriptor List.
DataDescriptor is a class, described by localDescriptorName (note "If this DataDescriptor is associated with a named parameter, this is the name") with a single value of type string,
described by dataType (note "the simple data type, e.g., float") with a single value of type anyURI,
described by specifiedUnits (note "the array of possible units") with a single value of type string List,
described by augmentedType (note "ties the DataDescriptor to the semantic domain model") with values of type AugmentedType,
described by descriptorVariable (note "This identifies the GPVariable, if any, in the AugmentedType which is associated with this DataDescriptor").
dataType of DataDescriptor has at most 1 value.
descriptorVariable of DataDescriptor has at most 1 value.
AugmentedType is a class.
augTypeUnits describes AugmentedType with a single value of type string List.
SemanticType (note "allows direct specification of the semantic type of an argument") is a type of AugmentedType,
described by semType with a single value of type class.
GraphPattern is a class.
{TriplePattern, FunctionPattern} are types of GraphPattern.
gpSubject describes TriplePattern.
gpPredicate describes TriplePattern.
gpObject describes TriplePattern.
builtin describes FunctionPattern with a single value of type ^Equation.
GPAtom is a class.
{GPVariable, GPLiteralValue, GPResource} are types of GPAtom.
gpVariableName describes GPVariable with a single value of type string.
gpLiteralValue describes GPLiteralValue with values of type data.
argValues (note "values of arguments to the built-in") describes FunctionPattern with a single value of type GPAtom List.
SemanticConstraint (note "used to identify necessary patterns in semantic domain terms") is a type of AugmentedType,
described by constraints with a single value of type GraphPattern List.
anyDataType (note "union of all relevant data types") is a type of {decimal or boolean or string or date or dateTime or anyURI}.

Note that the "^" before Equation is necessary because it is also a keyword in the grammar. Note also that the inputs to an equation are captured as a list of type DataDescriptor, where each element of the list may has a localDescriptorName and a dataType. The range of dataType is xsd:anyURI, a unique identifier of a class or data type. Similarly, the types of the returned values are captured in a list of type DataDescriptor. In this case there may not be an associated name as there is in the case of an argument. In both cases, arguments and returned values, the order is essential. The typed list construct allows us to capture that order.

The introduction above mentioned one problem being that an essential portion of knowledge surrounding a scientific model often remains implicit—the relationship between the inputs and with the output(s). Besides the speed of sound example, consider Newton's Second Law of F=ma, or more appropriately for our domain of hypersonics since mass of a rocket or airplane is not constant, F=d(mv)/dt. That F refers to a net force is often stated in the text surrounding a recitation of the equation, whereas the mass, the velocity, and the net force are all associated with the same physical object is often assumed. Even the standard stated form of area=PI*radius^2 is not usually presented with an explicit representation that the radius and the area are of the same circle. Again, it might likely be in an associated textual description (e.g., "the area of a circle is . . . ") that implies, at least to a human reader, that there is only one circle.

The SADL implicit model described above may be used to completely capture information, in the semantic model, about an equation and how it may be appropriately used. For example, consider an equation to compute the speed of sound.

External CAL_SOS(double T (temperature of a Gas {Kelvin, Rankine}),
   double G (gamma of the Gas),
   double R (gasConstant of the Gas {"g/mole", "lbm/lbmole"}),
   double Q (Theta {Kelvin, Rankine}),
   string us (UnitSystem {Metric, Imperial}))
   returns double (speedOfSound of the Gas {"m/sec", "ft/sec"}):
   "http://com.ge.research.darpa.aske.kchain.CAL_SOS".

This example equation may show what each equation argument and returned value means in domain terms. It may further indicate the appropriate units of inputs and output. For example, if the input temperature T is in Kelvin, the returned value speedOfSound is in m/sec, etc. The augmented type information also explicitly captures how the inputs and outputs are related to each other in domain terms. As in English, the use of the indefinite article in "a Gas" creates a binding to a particular Gas and the subsequent references with the definite article, "the Gas", indicates the same Gas. Thus, the Gas for which the temperature is an input is the same Gas for which the output is the speed of sound.

Although there is only one returned value in this example, the SADL equation grammar allows equations to return multiple values. This allows greater ability to leverage Python, which allows multiple return values.

Rules are another useful construct not directly supported by OWL but implemented by Semantic Web recommendations like SWRL. It is noted that SWRL is the acronym for Semantic Web Rule Language. OWL reasoners sometimes use this OWL-based rule representation. The SADL default reasoner is the Jena RDF rule engine, which has its own representation, Jena Rules. The SADL rule grammar is translated, by a translator associated with the selected reasoner, to the representation utilized by that reasoner. Jena Rules, SWRL, and Prolog are rule languages that have been supported or are supported by SADL. A SADL rule has a set of conditions in the "given" and/or "if" sections, also known as the rule "body" or "premises". If the conditions are met, the "then" section conclusions, or rule "head", are imposed. In the context of semantic models, it is essential that the rule engine which processes rules is tightly integrated with the OWL reasoner, which infers logical entailments implied by the OWL model and the scenario data.

In the extraction of knowledge from code, rules provide a means of expressing the reasoning that occurs over the code model constructed from the AST generated by the code parser. A code extraction meta-model captures the structure of the code from which extraction is occurring with classes like, for example, the following.

CodeElement is a class described by beginsAt with a single value of type int,
   described by endsAt with a single value of type int.
CodeBlock is a type of CodeElement,
   described by serialization with a single value of type string,
   described by comment with values of type Comment,
   described by containedIn with values of type CodeBlock.
{Class, Method, ConditionalBlock, LoopBlock} are types of CodeBlock.

Code extraction rules are expressed in terms of the model of the code expressed using this meta-model. This implements the separation of extraction from code from reasoning over that extraction mentioned above. For example, a rule to infer an implicit input to a code block may be as follows.

Rule ImplicitInput
   if cb is a CodeBlock and
   ref has codeBlock cb and
   ref has firstRef true and
   ref has usage Used
   and cv has reference ref
   then cem:input of ref is true and isImplicit of ref is true.

SADL supports SPARQL (i.e., a graph query language) queries as opaque strings. The SADL grammar supports a subset of the expressivity of SPARQL, and provides the advantage of error checking, syntax highlighting, etc. Using the same simple model as in the previous section, the following is a query in SADL syntax.

Ask: select c, r, ar
   where circle is a Circle and c has radius r and c has area ar.

This query translated to SPARQL is:

```
select ?c ?r ?ar where {?circle <http://www.w3.org/1999/02/22-rdf-syntax-ns#type>
<http://sadl.org/model.sadl#Circle> . ?c <http://sadl.org/model.sadl#radius> ?r . ?c
<http://sadl.org/model.sadl#area> ?ar}
```

The various Dialog constructs discussed in Section 3.2 are translated into SPARQL and executed using the SPARQL query engine embedded in SADL (the Jena ARQ query engine) using existing SADL functionality.

However, note that the rule makes this explicit. In the rule AreaOfCircle shown in Section 4.1.1.4, the conditions are that "c is a Circle", the input to the computation is "radius of c", and the conclusion makes explicitly clear that we have computed "area of c", so whatever instance of the Circle class is bound to c, that instance is the subject of a triple in the inferred semantic model with area as property and the computed number as value.

As all of the extractions of scientific knowledge from code and text may be placed into semantic models as illustrated above, construction of composite models to answer user queries may be accomplished through querying these semantic models over the desired inputs and outputs that have been captured. In other words, the constraints and assumptions governing the use of each equation are present in the augmented type information and allows an artificial intelligence to compose models satisfying these constraints and assumptions.

Another problem that we have raised in the sections above is that of units. Most equations take numeric inputs without units and return numeric results without units. The caller of the computational graph model (in this case the ANSWER backend software) must worry about the compatibility of the units of inputs, and the units of the outputs. The ability to convert from one set of units to another set of units may be built into a computational graph's composite models when reasoning over the knowledge graph indicates that unit conversion may be needed.

In one embodiment, one need that is not necessarily answered by this approach is the selection of a model for a computation when multiple models exist that could be used. The information favoring one model over another may be made explicit in the knowledge graph. Generally speaking, this information might include model accuracy, trust, and computational difficulty. These model properties may be learned over time.

Differential equations are an indispensable part of scientific modeling in many domains. Derivatives with respect to time show up in the models of almost all non-steady state systems. The speed of sound use case does not use differential equations, but they are seen as an important problem to address and solve.

Derivation can be numerical or symbolic. For example, consider Newtons Second Law, the force F is equal to the rate of change of mass m times velocity v with respect to time.

$$F=d(mv)/dt$$

If we have an equation form and v as a function of time, we can do symbolic differentiation. More specifically, a K-CHAIN computational model herein can use computational graph and automatic differentiation capabilities of modern machine learning packages, such as TensorFlow, to accomplish differentiation. In this case we can get a value of F for any input value of time t, assuming that the context is specific enough to allow the identification of the appropriate equations in terms of t. On the other hand, we might have a series of observations of mass and velocity at different points in time (a time-series data set) and one could, for each time step, obtain the change in the product of m and v over the time interval. If there are n observations in our set, we would have n−1 differentials and so could return n−1 values of F. Providing or identifying this data set to the computational graph, we could get an approximate value of F for any time t that is within the time window of the data series. Thus, the computational graph can handle both symbolic and numerical differentiation given sufficient information.

We have looked at several ways of representing derivatives in the semantic model. In many instances, the actual differentiation takes place in the computational graph, so the semantic side may only need to know that it happens and how to appropriately handle the units of results. One possible embodiment for a model of derivation is the following:
Derivative is a type of ScientificConcept,
  described by derivativeOf with a single value of type ScientificConcept,
  described by withRespectTo with a single value of type class.
With that meta-model, scientific concepts related to physical objects might be expressed as follows:
Time is a type of UnittedQuantity.
Length is a type of UnittedQuantity.
Position is a type of UnittedQuantity,
  described by x-coordinate with values of type Length,
  described by y-coordinate with values of type Length,
  described by z-coordinate with values of type Length,
  described by ^time with values of type Time.
Mass is a type of UnittedQuantity.
PhysicalObject is a class,
  described by mass with values of type Mass,
  described by position with values of type Position.
Velocity is a type of {UnittedQuantity and Derivative}.
derivativeOf of Position only has values of type Velocity.
withRespectTo of Position always has value Time.
velocity describes PhysicalObject with values of type Velocity.
Acceleration is a type of {UnittedQuantity and Derivative}.
derivativeOf of Velocity only has values of type Acceleration.
withRespectTo of Velocity always has value Time.
acceleration describes PhysicalObject with values of type Acceleration.
Momentum is a type of {UnittedQuantity and Derivative}.
momentum describes Mass with values of type Momentum.
Force is a type of {UnittedQuantity and Derivative}.
derivativeOf of Momentum only has values of type Force.
withRespectTo of Momentum always has value Time.
force describes PhysicalObject with values of type Force.

The integration of the knowledge graph and the computational graph may be accomplished in different ways. Since differentiation with respect to time is so prevalent, this kind of differentiation may special consideration, just as it does in many texts for human consumption where a dot over a variable indicates that it is differentiated with respect to time.

While the SADL grammar does allow expressions, it may not be expressive enough to represent equations in general. Therefore, some embodiments herein represent equations as ExternalEquations with the actual computational instructions captured outside the semantic model. Since Python is a very expressive language and is the language of choice for some embodiments of a computational graph using TensorFlow and is the language of choice for a number of other ASKE participants, we have chosen Python as the target language for representing equations. However, they are generated, from code, from text, or from user input, an equation serialized as Python is stored as a string using the expression property of Equation in our meta-model (see Section 4.1.1.3). This equation script is passed to the K-CHAIN computational graph using that REST service's build method. Other computational graph implementations, e.g., TA2 providers, can use these Python scripts or translate them into their desired languages.

To create a credible knowledge base for doing scientific modeling, one must capture a great deal of provenance information. For each model, one should be able to answer questions about from what source or sources was the model obtained, how credible and accurate it is believed to be, what data was used to access its accuracy, and for data-driven models, upon what data it was trained. A computed result should be annotated with information about the model that provided the calculation. One might also wish to keep metrics on model usage and even user-feedback. When a question cannot be answered (no model found), this should also be kept as guidance for further knowledge search. We have not yet focused on the meta-model to support provenance and accuracy information, but do not expect it to be particularly challenging.

In some aspects herein, when the same knowledge is found in multiple sources its credibility is to be increased. When sources are found which are contradictory, credibility should be decreased. In order to keep track of credibility scores for each nugget of knowledge, we plan to use Beta-Bernoulli distribution from Bayesian statistics. Here Beta distribution captures posterior distribution of the Bernoulli parameter and that parameter denotes the probability of knowledge being credible. The two hyperparameters of Beta distribution completely characterize the continuous distribution and they can be tractably updated sequentially when same knowledge or contradicting knowledge is encountered during curation. This credibility as an attribute of knowledge in the knowledge graph will be added in the ANSWER system.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software. In some embodiments, the execution of program code and other processor-executable instructions may be implemented by one or more processor-based devices, systems, and services, including but not limited to general purpose computing devices and systems and/or dedicated specific-purpose devices and systems, configured to implement the systems and processes disclosed herein.

Figure 14:
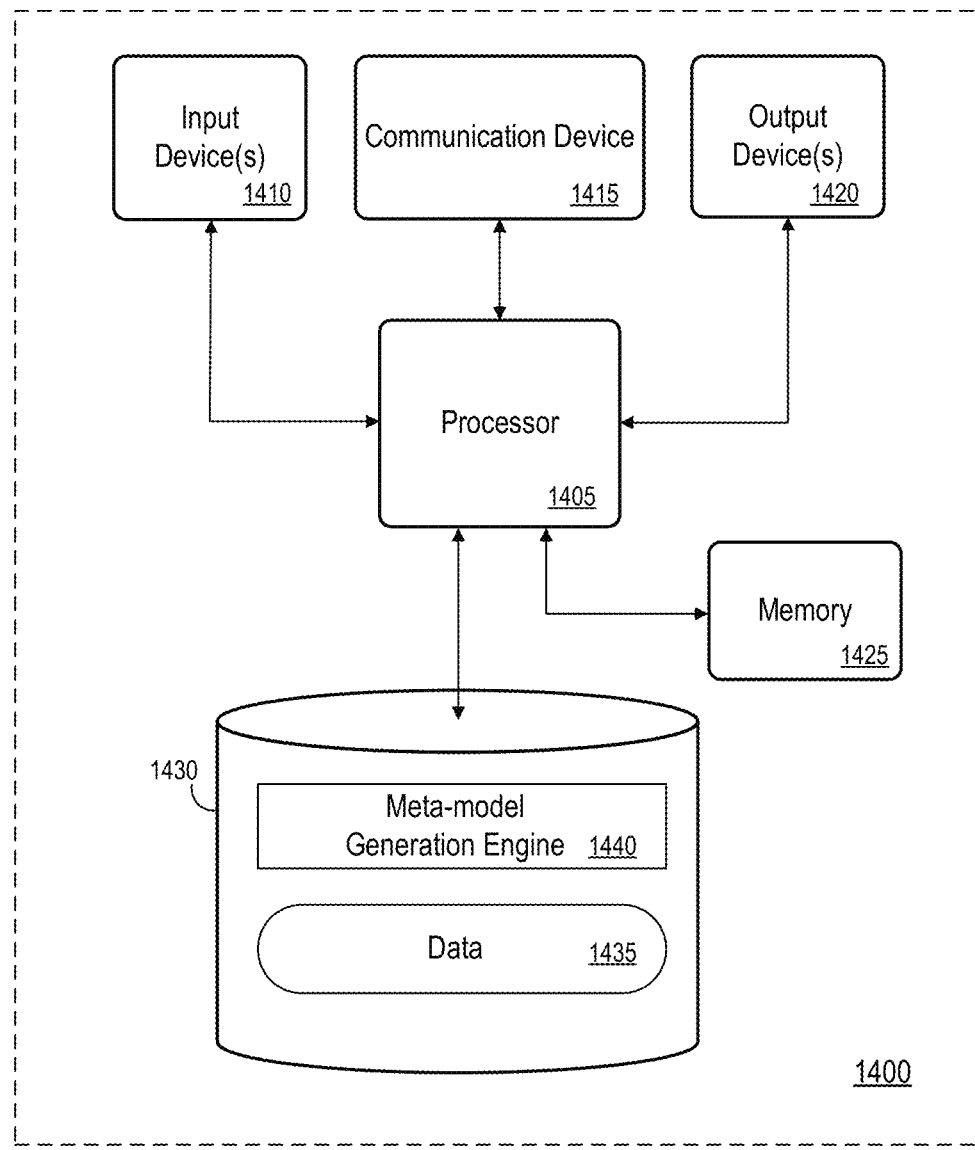
FIG. 14 is an is an illustrative depiction of a block diagram of computing system, according to some embodiments herein.

FIG. 14 is a block diagram of computing system 1400 according to some embodiments. System 1400 may comprise a general-purpose or special-purpose computing apparatus and may execute program code to perform any of the methods, operations, and functions described herein. System 1400 may comprise an implementation of one or more systems (e.g., 100, 200, 300) and processes disclosed herein. System 1400 may include other elements that are not shown, according to some embodiments.

System 1400 includes processor(s) 1405 operatively coupled to communication device 1415, data storage device 1430, one or more input devices 1410, one or more output devices 1420, and memory 1425. Communication device 1415 may facilitate communication with external devices, such as a data server and other data sources. Input device(s) 1410 may comprise, for example, a keyboard, a keypad, a mouse or other pointing device, a microphone, knob or a switch, an infra-red (IR) port, a docking station, and/or a touch screen. Input device(s) 1410 may be used, for example, to enter information into system 1400. Output device(s) 1420 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1425 may comprise Random Access Memory (RAM), Storage Class Memory (SCM) or any other fast-access memory. Data 1435 including, for example, meta-model representations of knowledge graph(s) of processes and/or portions thereof disclosed herein, and other data structures may be stored in data storage device 1430.

Meta-model generation engine 1440 may comprise program code executed by processor(s) 1405 to cause system 1400 to perform any one or more of the processes or portions thereof disclosed herein. Embodiments are not limited to execution by a single apparatus. Data storage device 1430 may also store data and other program code for providing additional functionality and/or which are necessary for operation of system 1400, such as device drivers, operating system files, etc.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
extract information from at least one of code and text documentation, the extracted information conforming to a base ontology and being extracted in the context of a knowledge graph, the extracting of information from code includes representing the code as an abstract syntax tree (AST), extract a set of equations from the codes based on an analysis of the AST, and expressing the extracted set of equations as a computational graph with semantic metadata characterizing the computational graph; and the extracting of information from text documentation includes identifying and extracting scientific concepts and equations in the text, reconciling extracted concepts with one or more existing concepts in the knowledge graph, identifying concepts between the extracted concepts, and expressing the extracted and reconciled concepts and the relations in a format compatible with the base ontology, wherein the extracting of information from at least one of code and text documentation comprises extracting aligned information from a plurality of sources of the at least one of code and text documentation;
add the extracted information to the knowledge graph, including the computational graph for the extracted code and the extracted and reconciled concepts and the relations for the extracted text;
generate, in a mixed interaction with a user selectively in communication with the system, computational models including scientific knowledge, wherein the mixed interaction includes statements between the user and the system that are initiated by either the user or the system and the statements are included in the computational models with annotations to their location; and
persist, in a memory, a record of the generated computational models.

2. The system of claim 1, wherein the mixed interaction of the user with the system includes a mechanism for the user to query the system, the user to provide unsolicited information to the system, the system to query the user and the system to consume information provided by the user.

3. The system of claim 1, wherein at least one of the computational models is generated independently of any interaction from the user.

4. The system of claim 1, wherein the extracting of information from at least one of the code and the text documentation further comprises at least one of extracting information from the code being informed by an extraction of information from the text, extracting information from the text being informed by an extraction of information from the code, and a combination thereof.

5. The system of claim 1, wherein the record of the generated computational models includes detailed knowledge indicative of a context of the knowledge represented by the computational model.

6. The system of claim 1, wherein the computational model representing the scientific knowledge is, at least one of, created, appended, overwritten, refined, and coarsened based on one or more of curated knowledge and user feedback.

7. A computer-implemented method, the method comprising:
- extracting, by a processor, information from at least one of code and text documentation, the extracted information conforming to a base ontology and being extracted in the context of a knowledge graph, the extracting of information from code includes representing the code as an abstract syntax tree (AST), extract a set of equations from the codes based on an analysis of the AST, and expressing the extracted set of equations as a computational graph with semantic metadata characterizing the computational graph; and the extracting of information from text documentation includes identifying and extracting scientific concepts and equations in the text, reconciling extracted concepts with one or more existing concepts in the knowledge graph, identifying concepts between the extracted concepts, and expressing the extracted and reconciled concepts and the relations in a format compatible with the base ontology, wherein the extracting of information from at least one of code and text documentation comprises extracting aligned information from a plurality of sources of the at least one of code and text documentation;
- adding, by the processor, the extracted information to the knowledge graph, including the computational graph for the extracted code and the extracted and reconciled concepts and the relations for the extracted text;
- generating, by the processor, in response to a mixed interaction with a user selectively in communication with the system, computational models including scientific knowledge, wherein the mixed interaction includes statements between the user and the system that are initiated by either the user or the system and the statements are included in the computational models with annotations to their location; and
- persisting, in a memory, a record of the generated computational models.

8. The method of claim 7, wherein the mixed interaction of the user with the system includes a mechanism for the user to query the system, the user to provide unsolicited information to the system, the system to query the user and the system to consume information provided by the user.

9. The method of claim 7, wherein at least one of the computational models is generated independently of any interaction from the user.

10. The method of claim 7, wherein the extracting of information from at least one of the code and the text documentation further comprises at least one of extracting information from the code being informed by an extraction of information from the text, extracting information from the text being informed by an extraction of information from the code, and a combination thereof.

11. The method of claim 7, wherein the record of the generated computational models includes detailed knowledge indicative of a context of the knowledge represented by the computational model.

12. The method of claim 7, wherein the computational model representing the scientific knowledge is, at least one of, created, appended, overwritten, refined, or coarsened based on one or more of curated knowledge and user feedback.

13. A non-transitory computer-readable medium storing instructions that, when executed by a computer processor, cause the computer processor to perform a method comprising:
- extracting information from at least one of code and text documentation, the extracted information conforming to a base ontology and being extracted in the context of a knowledge graph, the extracting of information from code includes representing the code as an abstract syntax tree (AST), extract a set of equations from the codes based on an analysis of the AST, and expressing the extracted set of equations as a computational graph with semantic metadata characterizing the computational graph and the extracting of information from text documentation includes identifying and extracting scientific concepts and equations in the text, reconciling extracted concepts with one or more existing concepts in the knowledge graph, identifying concepts between the extracted concepts, and expressing the extracted and reconciled concepts and the relations in a format compatible with the base ontology, wherein the extracting of information from at least one of code and text documentation comprises extracting aligned information from a plurality of sources of the at least one of code and text documentation;
- adding the extracted information to the knowledge graph, including the computational graph for the extracted code and the extracted and reconciled concepts and the relations for the extracted text;
- generating in response to a mixed interaction with a user selectively in communication with the system, computational models including scientific knowledge, wherein the mixed interaction includes statements between the user and the system that are initiated by either the user or the system and the statements are included in the computational models with annotations to their location; and
- persisting, in a memory, a record of the generated computational models.

14. The medium of claim 13, wherein the mixed interaction of the user with the system includes a mechanism for the user to query the system, the user to provide unsolicited information to the system, the system to query the user and the system to consume information provided by the user.

15. The medium of claim 13, wherein at least one of the computational models is generated independently of any interaction from the user.

16. The medium of claim 13, wherein the extracting of information from at least one of the code and the text documentation further comprises at least one of extracting information from the code being informed by an extraction of information from the text, extracting information from the text being informed by an extraction of information from the code, and a combination thereof.

17. The medium of claim 13, wherein the computational model representing the scientific knowledge is, at least one of, created, appended, overwritten, refined, or coarsened based on one or more of curated knowledge and user feedback.

* * * * *